Figure 5:
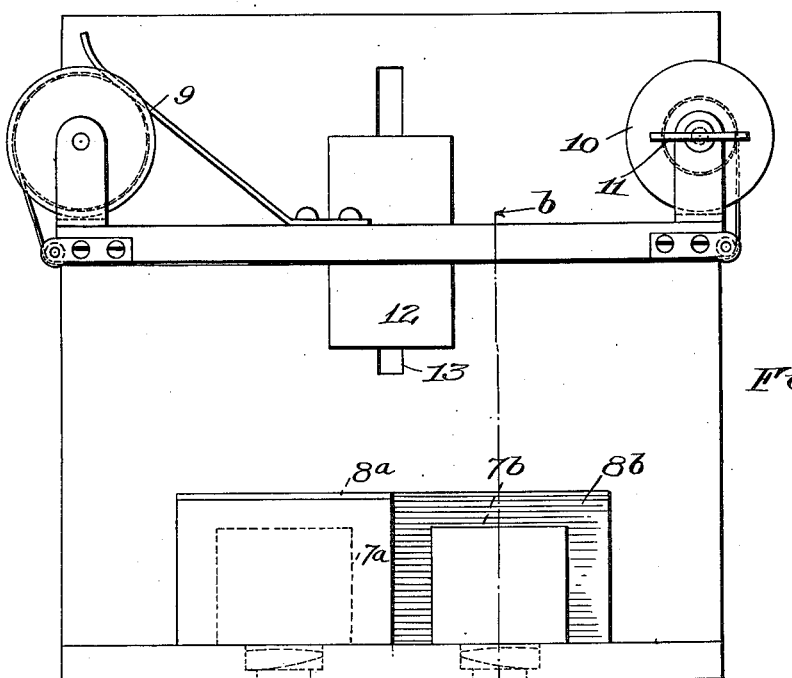

G. A. H. KELLNER.
STEREOSCOPIC APPLIANCE.
APPLICATION FILED MAY 31, 1907.
933,844.
Patented Sept. 14, 1909.
3 SHEETS—SHEET 1.
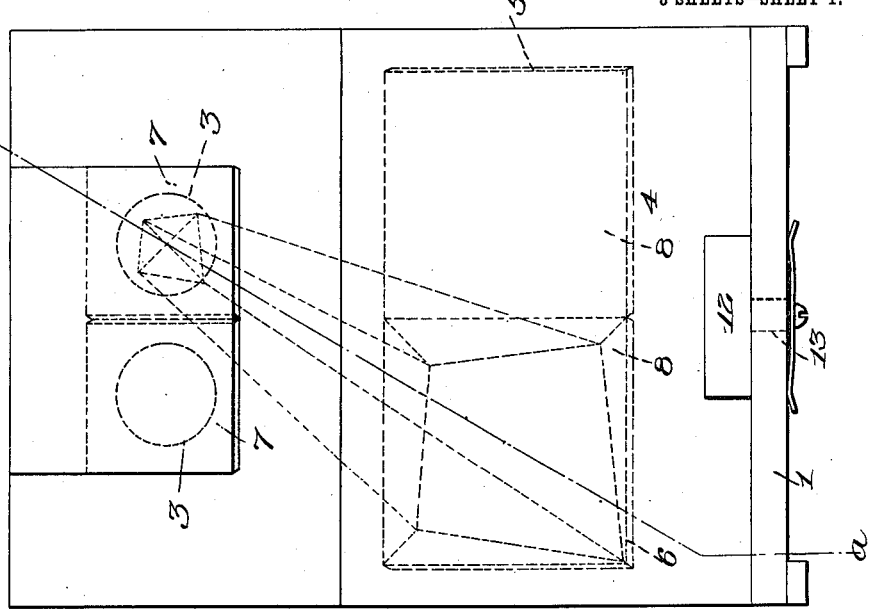
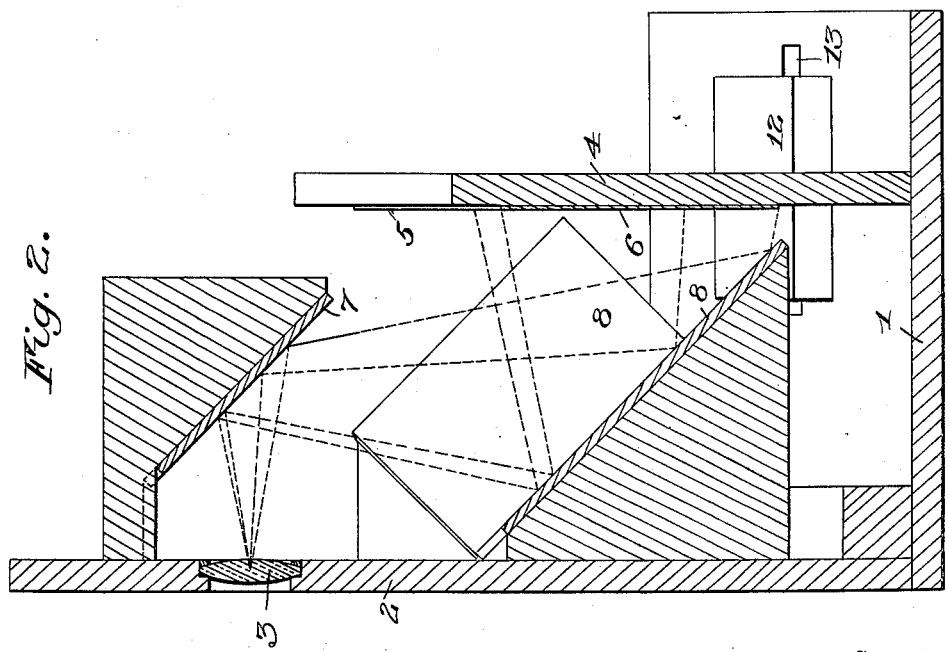

G. A. H. KELLNER.
STEREOSCOPIC APPLIANCE.
APPLICATION FILED MAY 31, 1907.
933,844.
Patented Sept. 14, 1909.
3 SHEETS—SHEET 2.
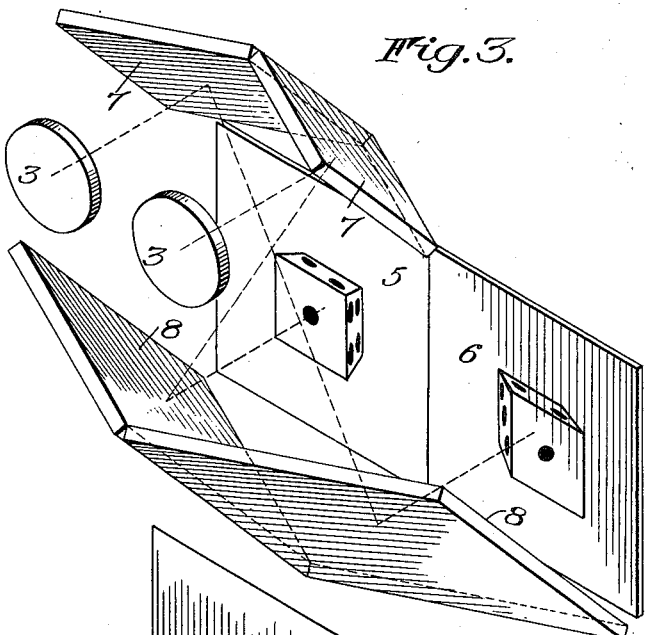
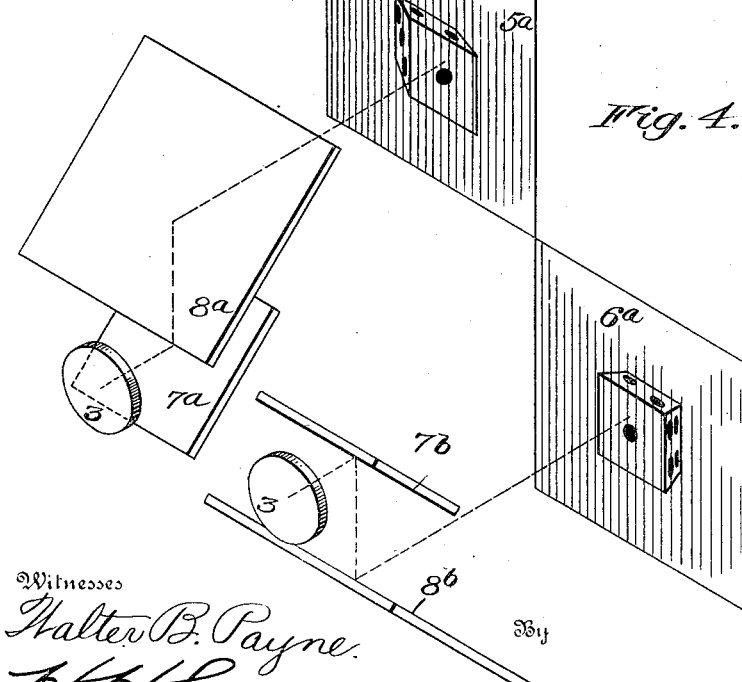

G. A. H. KELLNER.
STEREOSCOPIC APPLIANCE.
APPLICATION FILED MAY 31, 1907.

933,844.

Patented Sept. 14, 1909.
3 SHEETS—SHEET 3.

UNITED STATES PATENT OFFICE.

GUSTAV A. HERMANN KELLNER, OF ROCHESTER, NEW YORK, ASSIGNOR, BY MESNE ASSIGNMENTS, TO BAUSCH & LOMB OPTICAL COMPANY, OF ROCHESTER, NEW YORK, A CORPORATION OF NEW YORK, (NO. 2.)

STEREOSCOPIC APPLIANCE.

933,844.

Specification of Letters Patent.  Patented Sept. 14, 1909.

Application filed May 31, 1907.  Serial No. 376,515.

*To all whom it may concern:*

Be it known that I, GUSTAV A. HERMANN KELLNER, of Rochester, in the county of Monroe and State of New York, have invented certain new and useful Improvements in Stereoscopic Appliances; and I do hereby declare the following to be a full, clear, and exact description of the same, reference being had to the accompanying drawings, forming a part of this specification, and to the reference-numerals marked thereon.

This invention relates to stereoscopic appliances, such as stereoscopes and stereoscopic cameras.

A stereoscopic camera, as is well known, produces the two images in a position which is the reverse of that in which they are viewed through the ordinary stereoscope and as a consequence it is necessary to cut the finished picture to transpose the images.

The object of this invention is to obviate this transposing of the images by providing a means for deflecting the rays between the lenses of a stereoscopic camera or a stereoscope and the image without foreshortening the image, so that, by the camera, the two images are produced in positions suitable for an ordinary stereoscope, or, by the stereoscope when they are produced in reverse positions, they may be viewed without the usual transposition by cutting. Further, the invention when applied to stereoscopic cameras may be constructed to position the images in any relation to each other and when applied to stereoscopes may be constructed to suit any relative position of the images.

To these and other ends the invention consists in certain improvements and combinations of parts all as will be hereinafter more fully described, the novel features being pointed out in the claims at the end of the specification.

In the drawings: Figure 1 is a top view of a stereoscope embodying my invention; Fig. 2 is a section on line *a—a* of Fig. 1; Fig. 3 is a diagrammatic view of the same embodiment Fig. 4 is a diagrammatic view of another embodiment Fig. 5 is a top view of the embodiment shown in Fig. 4, and, Fig. 6 is a section on line *b—b* Fig. 5.

The invention is herein shown and described as embodied in a stereoscope which in this instance preferably comprises a suitable support or base 1 having thereon a front board or other suitable member 2 formed with view openings in which are preferably arranged suitable collective lenses 3. Arranged preferably on the base 1 is a suitable image holder 4 adapted to hold two images in the same plane. The optical relation between the images and the lenses or view openings is maintained, without causing a foreshortening of the image, by a series of deflectors suitably arranged to accomplish this result.

In the embodiment shown in Figs. 1 to 3 the images 5 and 6 are arranged in a vertical plane and in horizontal alinement and a pencil of rays passes from each view opening or lens 3 to a reflector 7 arranged at an angle of 45° to the pencil, thence at right angles to a reflector 8 also arranged at 45°, and finally to the image 5 or 6, that portion of each pencil between the reflectors 7 and 8 crossing the other and causing a transposition of the images, only one pencil being shown in Figs. 1 and 2 so that the illustration will be clear.

Figure 6:
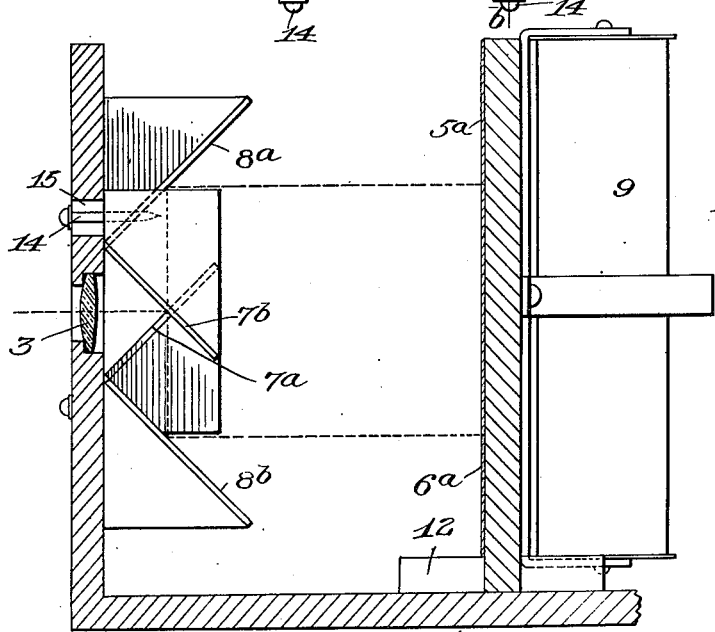

In the embodiment shown in Figs. 4, 5 and 6, the images $5^a$ and $6^a$ are arranged in the same vertical plane and are out of horizontal alinement and the pencil, in one instance, passes to a reflector $7^a$ arranged at an angle of 45° thereto, thence upwardly to a reflector $8^a$ also arranged at an angle of 45° and finally horizontally to the image $5^a$; and, in the other instance, passes to a reflector $7^b$ arranged at an angle of 45° thence downwardly to a reflector $8^b$ also arranged at an angle of 45° and finally horizontally to the image $6^a$. The images in this instance may be arranged on rolls 9 and 10 and fed in any suitable manner as for instance by handle 11 to give a panoramic effect. The image holder in both instances may be adjusted in the direction of the optical axis of the device as by a block 12 working in a slot 13 in the base to accommodate the eyes of different persons. Of course with different sizes of images the relation of the parts will have to be changed and for this reason I provide means permitting the shifting of the axis of the pencil on the image which in this instance comprises a screw 14 working in a slot 15 so that the reflectors $7^a$ and $7^b$ are adjustable in the direction of the axes of the pencils (see Figs. 5 and 6).

It is to be understood that the term "lenses" herein employed is used for the purpose of including the lenses of a stereoscopic camera or the lenses of a stereoscope and that the term "image holder" is employed as generic to a negative holder of a stereoscopic camera or a picture holder of a stereoscope.

I claim as my invention.

1. In a stereoscopic appliance, the combination with a holder adapted for images in one plane and a member having a pair of view openings, of two reflectors for each pencil of rays, arranged with their reflecting surfaces parallel with each other and at angles to the pencil and maintaining optical relation between the view openings and the image holder.

2. In a stereoscopic appliance, the combination with a holder adapted for images in one plane and a pair of lenses, of two reflectors for each pencil of rays, arranged with their reflecting surfaces parallel with each other and at angles to the pencil of rays and maintaining optical relation between the lenses and the image holder.

3. In a stereoscopic appliance, the combination with an image holder for a pair of images arranged in the same plane side by side, of a member having a pair of view openings, and means for maintaining optical relation between the view openings and the image holder comprising deflectors for each pencil arranged at such angles to each other and to the view openings and the image holder that the images are transposed without being reversed.

4. In a stereoscopic appliance, the combination with an image holder and a member having a pair of view openings, of means for maintaining optical relation between said view openings and the image holder consisting of a pair of deflectors for each view opening having their deflecting surfaces arranged substantially parallel to each other, the axis of the rays between one pair of deflectors, being arranged to cross the axis of the rays between the other pair of deflectors.

GUSTAV A. HERMANN KELLNER.

Witnesses:
RUSSELL B. GRIFFITH,
H. H. SIMMS.